United States Patent Office 3,428,730
Patented Feb. 18, 1969

3,428,730
ANTIBACTERIAL MIXTURE OF O-CARBAMYL-D-SERINE AND D-4-AMINO-3-ISOXAZOLIDONE
Hamao Umezawa, 23 Kita-4-chome, Toyotama, Nerima-ku, and Nobuo Tanaka, Kaminumacho 3-909, Setagaya-ku, Tokyo, Japan
No Drawing. Continuation of application Ser. No. 418,535, Dec. 15, 1964. This application June 30, 1967, Ser. No. 650,552
U.S. Cl. 424—114      3 Claims
Int Cl. A61k 21/00

ABSTRACT OF THE DISCLOSURE

A mixture of antibacterial agents which contains O-carbamyl-D-serine and D-4-amino-3-isoxazolidone in the ratio of 0.25–10 of the former to 1 of the latter and which exhibits stronger antibacterial activity than D-4-amino-3-isoxazolidone alone.

---

This application is a continuation of prior copending application Ser. No. 418,535, filed Dec. 15, 1964, now abandoned.

This invention relates to a product which contains O-carbamyl-D-serine and which enhances the antibacterial activity of D-4-amino-3-isoxazolidone, and which exhibits stronger antibacterial activity than D-4-amino-3-isoxazolidone alone.

In the course of study on the modus of action of O-carbamyl-D-serine, the inventors discovered its strong synergetic activity with D-4-amino-3-isoxazolidone. D-4-amino-3-isoxazolidone is a known substance which was produced by Streptomyces garyphalus, Streptomyces orchidaceus, Streptomyces lavendulae and others, and exhibited weak inhibitory activity against either Gram positive or negative bacteria including mycobacteria on the synthetic media. Since D-4-amino-3-isoxazolidone is inhibitory in mice against the infection of Gram positive and negative bacteria and it is effective against human tuberculosis with the combined use of other antituberculosis agents, it has been used for chemotherapy of human infections. However, D-4-amino-3-isoxazolidone causes a side-reaction to the nervous system at its high dosage, and therefore it is a desirable thing to find a product which enhances the therapeutic activity of D-4-amino-3-isoxazolidone and reduces the therapeutic dose. O-carbamyl-D-serine is a known antibiotic which was isolated from the cultured broth of an Actinomycete by Hagemann et al. in 1955 and was synthesized by Skinner et al. in 1956. Lately, it was isolated from the cultured broth of a Streptomyces resembling Streptomyces fragilis by Okami et Umezawa in 1962. The present inventors isolated this substance also from a chromogenic Streptomyces which produced D-4-amino-3-isoxazolidone simultaneously.

D-4-amino-3-isoxazolidone inhibits the formation of bacterial cell wall and the inventors found that O-carbamyl-D-serine also inhibits the synthesis of bacterial cell wall. Moreover, the present inventors discovered strong synergism of O-carbamyl-D-serine with D-4-amino-3-isoxazolidone. D-4-amino-3-isoxazolidone inhibits Bacillus subtilis at the concentration of 25 µg./cc. on ordinary nutrient medium, Corynebacterium diphtheriae at 6.25 µg./cc., Diplococcus pneumoniae at 50 µg./cc., Escherichia coli at 50 µg./cc., Klebsiella pneumoniae at 50 µg./cc., Staphylococcus at 25–50 µg./cc., Neisseria gonorrhoeae at 200 µg./cc., Salmonella typhosa at 100 µg./cc., Shingella dysenteriae at 100 µg./cc. and Streptococcus at 100 µg./cc. As shown in the above, this substance has broad spectrum of antibacterial activity but its activity is not strong. The antibacterial activity of this substance is antagonized by D-alanine and increased to 5 times strength in a synthetic medium without containing D-alanine. M. tuberculosis is inhibited at 5–10 µg./cc. in a synthetic medium.

O-carbamyl-D-serine in a synthetic medium exhibited only 1/10 of antibacterial activity of D-4-amino-3-isoxazolidone. As discovered by the present inventors, D-4-amino-3-isoxazolidone increases its antibacterial activity against various pathogenic bacteria up to 2–16 times strength by the addition of a small amount of O-carbamyl-D-serine which is not able to show the antibacterial activity. This increase of antibacterial activity is achieved not only in vitro but also in vivo.

Accordingly, the inventors succeeded to obtain a product of D-4-amino-3-isoxazolidone which improved its therapeutic value by combination with a proper amount of O-carbamyl-D-serine. D-4-amino-3-isoxazolidone and O-carbamyl-D-serine were mixed at the ratio of 1:0.25–10 in weight respectively and homogenized. For this preparation, the mixing and grinding of both substances in powder form, or the distillation and drying of their aqueous solutions are available. It is also possible to prepare the mixture of these antibiotics by lyophilization of their mixed solution. An active preparation thus obtained, exhibited the same activity as a preparation containing 2–8 times weight of D-4-amino-3-isoxazolidone alone.

The following examples are merely illustrative and is not intended that the invention should be limited in the examples shown below.

EXAMPLE 1

One gram of D-4-amino-3-isoxazolidone in powder form was added with 1 g. of O-carbamyl-D-serine in powder form and ground well to mix. This powdered product inhibited Bacillus subtilis in a synthetic medium at 1.25 µg./cc. when it is calculated as the weight of D-4-amino-3-isoxazolidine itself and M. tuberculosis at 1–2 µg./cc. And its 5 mg./kg. protected mice infected by staphylococci with mucin. As the conrol, the minimal inhibitory concentration of D-4-amino-3-isoxazolidone itself was 10 µg./cc. against Bacillus subtilis and 50 mg./kg. of D-4-amino-3-isoxazolidone was necessary for protection of mice from infection of staphylococci. On the other hand, O-carbamyl-D-serine showed the minimal inhibitory concentration at 100 µg./cc. against Bacillus subtilis and its 100 mg./kg. showed only a weak protective activity against the infection of staphylococci.

EXAMPLE 2

The aqueous solution containing 1 g. of D-4-amino-3-isoxazolidone was added with 10 g. of O-carbamyl-D-serine and this mixed solution was dried in frozen state. This powder inhibited M. tuberculosis at 1–2 µg./cc., if it was calculated by the weight of D-4-amino-3-isoxazolidone. Whereas 10 µg./cc. of D-4-amino-3-isoxazolidone was necessary for inhibition of M. tuberculosis. O-carbamyl-D-serine itself inhibited M. tuberculosis at 100 µg./cc.

What we claim is:
1. A new mixture of antibacterial agents which contains O-carbamyl-D-serine and D-4-amino-3-isoxazolidone in the ratio of 0.25–10 of the former to 1 of the latter and which exhibits stronger antibacterial activity than D-4-amino-3-isoxazolidone alone.

2. In a method of inhibiting pathogenic bacteria by contact with D-4-amino-3-isoxazolidone, the improvement comprising, contacting said bacteria with a mixture as claimed in claim 1.

3. The method of claim 2 wherein pathogenic staphylococci bacterial infections in vivo in mice are inhibited by administering 5 mg./kg. body weight of a 1:1 ratio of said mixture.

References Cited

Tanaka et al. (I). J. Antibiotics (Tokyo) Ser. A 16(6): 217–221, November 1963.

Tanaka et al. (II). J. Antibiotics (Tokyo) Ser. A 17(1): 8–10, January 1964.

LEWIS GOTTS, *Primary Examiner.*

S. K. ROSE, *Assistant Examiner.*

U.S. Cl. X.R.

424—272